United States Patent
Judd et al.

(10) Patent No.: US 9,361,399 B2
(45) Date of Patent: *Jun. 7, 2016

(54) CONTENT MANAGEMENT AND TRANSFORMATION SYSTEM FOR DIGITAL CONTENT

(71) Applicant: Callahan Cellular L.L.C., Wilmington, DE (US)

(72) Inventors: David T. Judd, Atlanta, GA (US); Jason A. Brewster, Atlanta, GA (US); P. Michael Melia, Avondale Estates, GA (US); David J. Lilly, Atlanta, GA (US)

(73) Assignee: Callahan Cellular L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,840

(22) Filed: Dec. 30, 2014

(65) Prior Publication Data

US 2015/0180956 A1 Jun. 25, 2015

Related U.S. Application Data

(63) Continuation of application No. 11/306,640, filed on Jan. 5, 2006, which is a continuation of application No. 09/912,220, filed on Jul. 24, 2001, now Pat. No. 7,016,963.

(60) Provisional application No. 60/302,035, filed on Jun. 29, 2001.

(51) Int. Cl.
*H04L 29/08* (2006.01)
*G06F 17/30* (2006.01)
*H04L 29/06* (2006.01)

(52) U.S. Cl.
CPC ...... *G06F 17/3092* (2013.01); *G06F 17/30864* (2013.01); *G06F 17/30905* (2013.01); *H04L 67/10* (2013.01); *H04L 67/42* (2013.01)

(58) Field of Classification Search
None
See application file for complete search history.

(56) References Cited

U.S. PATENT DOCUMENTS 5,299,304 A 3/1994 Williams et al.
5,583,762 A 12/1996 Shafer (Continued)

FOREIGN PATENT DOCUMENTS

EP 883272 A2 12/1998
GB 2376767 A 12/2002
WO 03003641 1/2003

OTHER PUBLICATIONS

Albers, M.J. et al. "User Web Browsing Characteristics Using Palm Handhelds for Information Retrieval," IEEE Conference on Computer Documentation, Sep. 2000, p. 125-135.

(Continued)

*Primary Examiner* — Angela Nguyen
(74) *Attorney, Agent, or Firm* — Perkins Coie LLP

(57) ABSTRACT

A transformation engine that enables content and information to be transformed from one format, a source format, to a format that is compatible with the requesting device, a destination format. Advantageously, various device types can access and share content via a network without concern as to the original format of the content. When a client device provides a request for content, the transformation engine identifies delivery characteristics of the client device, and identifies a source for the requested content. The transformation engine then transforms the source formatted content into a format identified through a best fit analysis of the delivery characteristics of the device.

20 Claims, 4 Drawing Sheets

(56) References Cited

U.S. PATENT DOCUMENTS

| | | | |
|---|---|---|---|
| 5,587,902 | A | 12/1996 | Kugimiya |
| 5,848,386 | A | 12/1998 | Motoyama |
| 5,915,259 | A | 6/1999 | Murata |
| 5,926,823 | A | 7/1999 | Okumura et al. |
| 5,943,643 | A | 8/1999 | Van De Veen |
| 5,987,403 | A | 11/1999 | Sugimura |
| 6,009,436 | A | 12/1999 | Motoyama et al. |
| 6,012,098 | A | 1/2000 | Bayeh et al. |
| 6,014,680 | A | 1/2000 | Sato et al. |
| 6,021,202 | A | 2/2000 | Anderson et al. |
| 6,046,985 | A | 4/2000 | Aldred et al. |
| 6,061,697 | A | 5/2000 | Nakao et al. |
| 6,085,196 | A | 7/2000 | Motoyama et al. |
| 6,088,515 | A | 7/2000 | Muir et al. |
| 6,148,142 | A | 11/2000 | Anderson et al. |
| 6,169,989 | B1 | 1/2001 | Eichstaedt et al. |
| 6,185,608 | B1 | 2/2001 | Hon et al. |
| 6,202,072 | B1 | 3/2001 | Kuwahara |
| 6,208,956 | B1 | 3/2001 | Motoyama |
| 6,230,173 | B1 | 5/2001 | Ferrel et al. |
| 6,233,592 | B1 | 5/2001 | Schnelle et al. |
| 6,233,731 | B1 | 5/2001 | Bond et al. |
| 6,246,410 | B1 | 6/2001 | Bergeron et al. |
| 6,250,309 | B1 | 6/2001 | Krichen et al. |
| 6,279,015 | B1 | 8/2001 | Fong et al. |
| 6,405,216 | B1 | 6/2002 | Minnaert et al. |
| 6,418,446 | B1 | 7/2002 | Lection et al. |
| 6,424,979 | B1 | 7/2002 | Livingston et al. |
| 6,507,857 | B1 | 1/2003 | Yalcinalp |
| 6,542,912 | B2 | 4/2003 | Meltzer et al. |
| 6,600,502 | B1 | 7/2003 | Brewster, Jr. |
| 6,763,388 | B1 | 7/2004 | Tsimelzon |
| 6,779,153 | B1 | 8/2004 | Kagle |
| 6,829,745 | B2 | 12/2004 | Yassin et al. |
| 7,016,963 | B1 | 3/2006 | Judd et al. |
| 7,685,252 | B1 | 3/2010 | Maes et al. |
| 2002/0069196 | A1 | 6/2002 | Betros et al. |
| 2002/0116491 | A1 | 8/2002 | Boyd et al. |
| 2003/0004707 | A1 | 1/2003 | Ferino |
| 2006/0200761 | A1 | 9/2006 | Judd et al. |

OTHER PUBLICATIONS

Imamura, Takeshi et al. "Mapping Between ASN.1 and XML," IEEE Symposium on Applications and the Internet, Jan. 2001, pp. 57-64.

International Searching Authority, International Search Report, PCT Application PCT/US2002/016925, Dec. 19, 2002, 5 pages.

Koyanagi, Teruo et al. "Demonstrational Interface for OSLT Stylesheet Generation, Markup Languages: Theory & Practice 2.2," Massachusetts Institute of Technology, vol. 2, No. 2, 2000, pp. 133-152.

Makoto, Murata. "Data Model for Document Transformation and Assembly (Extended Abstract)," Lecture Notes in Computer Science, 1481, Principles of Digital Document Processing 4th International Workshop, PODDP '98 Saint Malo, France, Mar. 1998, pp. 140-152.

Masahiro, Hon et al. "Authoring Tool for Web Content Transcoding, Markup Language: Theory & Practice," Massachusetts Institute of Technology, vol. 2, No. 1, 2000, pp. 65-80.

Matzen, R.W. "A New Generation Department of Tools for SGML," Oklahoma State University Department of Computer Science, vol. 1, No. 1, 1998, pp. 47-74.

Ouahid, H. et al. "Converting Web Pages into Well-formed XML Documents," IEEE ICC '99, vol. 1, Jun. 1999, pp. 676-680.

Sakai, Noriko et al. "Transformation Method of Logical Structures Between SGML Documents," vol. 39, No. 1, Jan. 1998, 11 pages.

Schroff, Thomas et al. "Grammar-Compatible Stylesheets, Lecture Notes in Computer Science 1481," Principles of Digital Document Processing 4th International Workshop, PODP '96 Palo Alto, California, USA, Sep. 1996, pp. 51-58.

Severson, Eric. "The Art of SGML Conversion: Eating your Vegetables and Enjoying Dessert," Avalanche Development Company/Interleaf Inc., Jan. 1995, 10 pages.

United States Patent and Trademark Office, Advisory Action, U.S. Appl. No. 11/306,640, mailed Jun. 23, 2010, 3 pages.

United States Patent and Trademark Office, Final Office Action, U.S. Appl. No. 11/306,640, mailed Apr. 16, 2009, 17 pages.

United States Patent and Trademark Office, Final Office Action, U.S. Appl. No. 11/306,640, mailed Apr. 16, 2010, 21 pages.

United States Patent and Trademark Office, Final Office Action, U.S. Appl. No. 11/306,640, mailed Jan. 25, 2013, 15 pages.

United States Patent and Trademark Office, Non-Final Office Action, U.S. Appl. No. 09/912,220, mailed Dec. 24, 2003, 5 pages.

United States Patent and Trademark Office, Non-Final Office Action, U.S. Appl. No. 09/912,220, mailed Mar. 29, 2005, 6 pages.

United States Patent and Trademark Office, Non-Final Office Action, U.S. Appl. No. 11/306,640, mailed Apr. 9, 2014, 6 pages.

United States Patent and Trademark Office, Non-Final Office Action, U.S. Appl. No. 11/306,640, mailed Aug. 3, 2012, 13 pages.

United States Patent and Trademark Office, Non-Final Office Action, U.S. Appl. No. 11/306,640, mailed May 5, 2011, 22 pages.

United States Patent and Trademark Office, Non-Final Office Action, U.S. Appl. No. 11/306,640, mailed Oct. 15, 2009, 20 pages.

United States Patent and Trademark Office, Non-Final Office Action, U.S. Appl. No. 11/306,640, mailed Oct. 16, 2008, 15 pages.

United States Patent and Trademark Office, Notice of Allowance, U.S. Appl. No. 09/912,220, mailed Oct. 3, 2005, 18 pages.

United States Patent and Trademark Office, Notice of Allowance, U.S. Appl. No. 11/306,640, mailed Sep. 30, 2014, 10 pages.

United States Patent and Trademark Office, Restriction Requirement, U.S. Appl. No. 09/912,220, mailed Jul. 8, 2004, 4 pages.

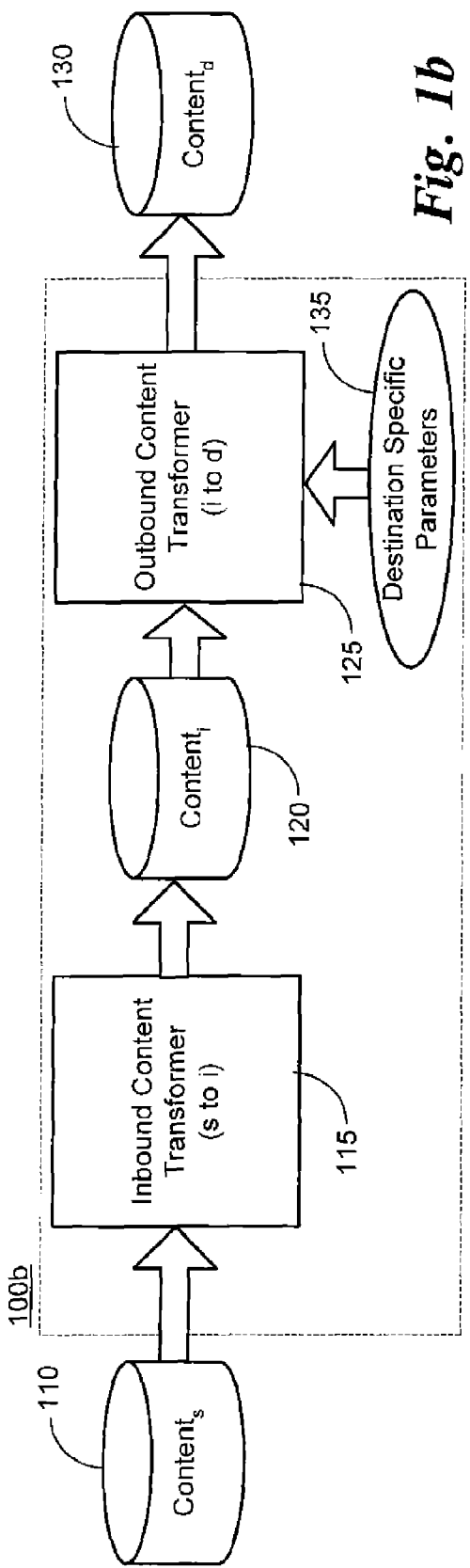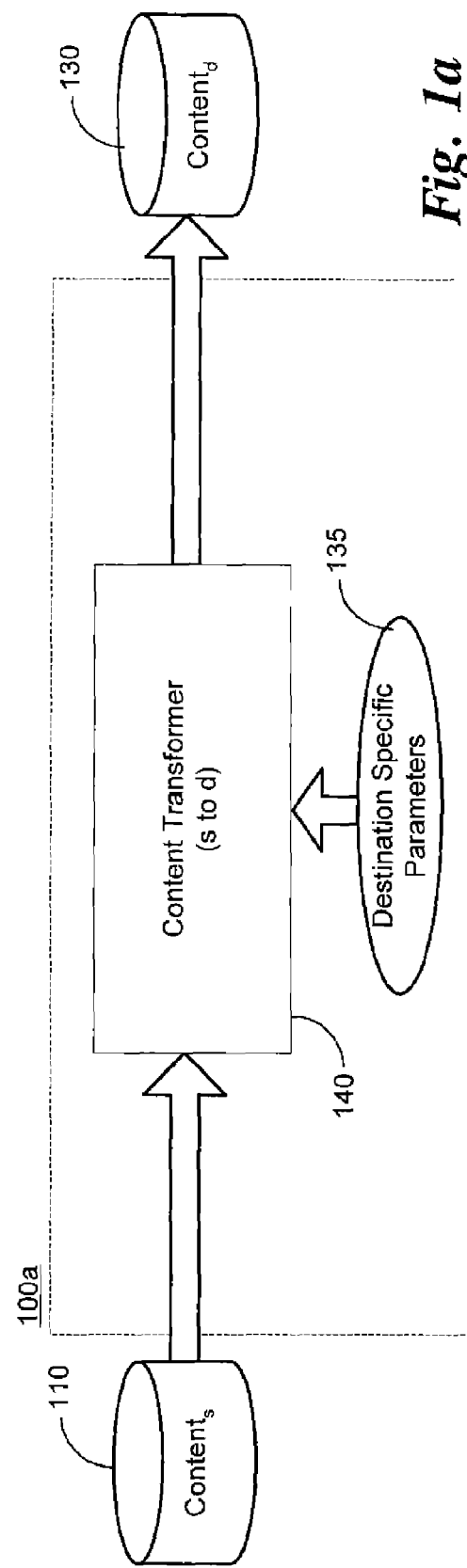

CONTENT MANAGEMENT AND TRANSFORMATION SYSTEM FOR DIGITAL CONTENT

CROSS-REFERENCE TO RELATED APPLICATIONS

This application is a continuation of U.S. patent application Ser No. 11/306,640, filed on Jan. 5, 2006, now U.S. Pat. No. 9,092,546, which is a continuation of U.S. patent application Ser. No. 09/912,220, filed on Jul. 24, 2001, now U.S. Pat. No. 7,016,963, which claims the benefit of U.S. Provisional Patent Application Ser. No. 60/302,035 entitled "CONTENT MANAGEMENT AND TRANSFORMATION SYSTEM FOR SGML CONTENT" filed on Jun. 29, 2001. All of the applications listed above are hereby incorporated by reference in their entireties.

BACKGROUND OF THE INVENTION

The present invention relates to the transformation of information from one of a plurality of formats that may be utilized by an information source, to another of a plurality of formats that is required or desired by a destination for that information and, more particularly, the transformation of content from one markup language format to the same or another markup language format. In addition, the present invention relates to use of this transformation in allowing a variety of platforms to access content and/or applications regardless of the source format of that content.

One of the primary capabilities that has fueled the popularity of the Internet is the ability to share information and technology. What other technology could a professor in a remote village in China use to share his ability to program or create content with a student in Midland, Tex.? Through the technology of the Internet and its ability to allow downloading of applications, resources, and information using client-server principles, these types of transactions take place millions of times every hour.

Many times, during the spawning of a new technology, in an effort to rush the deployment and acceptance of the new technology, the technological community may adopt a less sophisticated or inferior embodiment of a new technology. Such compromises are usually driven by the consumer or the desire to have a product to market before one's competitors. The adoption of inferior embodiments can result in creating artificial limitations on the technology—limitations based on format and compatibility issues rather than technology issues. The rapid growth and deployment of the world wide web, coupled with the introduction of increasingly sophisticated client formats, languages, types of content and platforms, has given rise to such a situation.

When the world is faced with an inferior embodiment of a new technology, over time, the problem usually is corrected. Two methods for correcting the problem include the deployment of a new or next generation technology, or the development of another technology to resolve or alleviate the problem. The present invention is directed towards this second method, while at the same time, providing a revolutionary technology that will expand the usability of the Internet.

One of the primary roles of the Internet is as a source of content. Due to the ease of a device being interfaced to the Internet, a vast array of different devices are connected to and interact over the Internet. Each of these devices may be a source of content to other devices through the Internet or, may attempt to access content from other devices through the Internet. Similar devices, or devices that store and utilize content in a similar format, can easily share content over the Internet. However, dissimilar devices, or devices that utilize different or even incompatible formats, cannot easily share content.

This information or content incompatibility problem is not unique to the Internet. This problem has also reared its head in other areas such as word processing, databases, or other applications that create and store files in a particular format. One technique that has been adopted is the use of conversion programs. A conversion program will read information in one format and convert it to a different format. For instance, Microsoft Word includes an embedded conversion program that will allow a Word Perfect document to be converted to Microsoft Word format. This type of conversion program is not a viable solution for the sharing of content over the Internet. One reason is that there is a large number of formats, and even new formats being introduced, for content on the Internet. The conversion program would be very complex, processor intensive, and large. In addition, when accessing content through the Internet, it may be difficult or impossible to know in what format the content is stored. For small, portable, and wireless devices that access content over the Internet, these characteristics render this technique useless. Thus, there is a need in the art to allow devices that require content in a particular format, to access content through the Internet, or any other local or global network, regardless of the format in which the content is stored.

One general format for content that is prolific on the Internet is markup languages. A markup language is a set of codes and/or characters that are interspersed with text and references to other content. The markup language directs the processing of an application that displays the content. Many different markup languages have been developed and content can be found on the Internet in any one of the variety of markup languages. However, the basic function of a markup language is to instruct an application with regards to how to display or render a particular item. For instance, the following line in Rich Text Format, a markup language used by many personal computer based applications, {\b\f3\fs24\ul Melia Design Group—Creators of Nimbus\'99} would result in causing a work processor to render the name "Melia Design Group—Creators of Nimbus™" as bolded (\b), 12 point (\fs24) courier font (\f3), and underlined with one line (\ul):

Melia Design Group—Creators of Nimbus™

The Standard Generalized Markup Language (SGML) is a descriptive markup language that basically provides a set of rules for creating other markup languages. Rather than instructing an application as to the particular aspects of a piece of text (i.e., bold, underlined, italicized) the SGML language describes a category for the text (i.e., title, level 2 heading, bulleted entry, etc.). The exact particulars of the SGML format can be found in the standard ISO 8879:1986. Several markup languages have been created through SGML, the most popular of which is the Hyper Text Markup Language (HTML) which was mainly created for use on the world wide web. SGML has also been used to create markup languages for a multitude of applications including word processors, parsers, and publishing, as well as other document formatting languages such as DHTML, XML, XHTML, GML and HDML.

The eXtensible Markup Language (XML) is an SGML markup language supported by the World Wide Web Consortium (W3C) and basically is a web-ready subset of SGML. As a subset of SGML, XML is more suitable for providing content to devices that are limited in memory or processing resources. Parsers and applications that utilize XML can be smaller and less processor intensive. As a subset of SGML, content that is stored in XML format is also valid SGML content. However, all SGML content is not necessarily valid XML content.

Thus, many markup languages have been developed (some of which are compatible with others, incompatible with others, limited in capabilities, etc.), and are in use within the Internet today. These markup languages allow devices and/or applications that support the markup language, to render content onto the device in a particular fashion. Other tools have also been developed to help control the rendering of content. Stylesheets is an example of one such tool. Stylesheets describe how a particular document (content) is to be presented on a screen, display, print, or otherwise. By attaching stylesheets to markup language structured documents (e.g. HTML) authors and readers can influence the presentation of the content without losing device independence.

The eXtensible Stylesheet Language (XSL) is a language for expressing stylesheets. One of the components of XSL is the XSL Transformations (XSLT) which is a language for transforming XML documents. A transformation expressed in XSLT is called a stylesheet because the transformation functions as a stylesheet—describes rules for transforming a source tree into a result tree. The stylesheet contains a set of template rules with each template rule having two parts: (1) a pattern which is matched against nodes in a source tree and (2) a template which can be utilized to form part of the result tree. The transformation is performed by associating patterns with templates. A pattern is matched against elements in the source tree. A template is instantiated to create part of the result tree. The result tree is separate from the source tree and, the structure of the result tree can be completely different from the structure of the source tree. In constructing the result tree, elements from the source tree can be filtered and reordered, and arbitrary structure can be added. In operation, the stylesheet declares what output should be produced when a pattern in the XML document is matched. Additional information about the operation of the XSLT can be obtained from the W3C or by visiting its website at the URL of http://www.w3.org.

Overall, the use of XSLT allows XML documents to be reformatted according to the parameters of XSL stylesheets, and presentation flexibility of the XML source can be obtained. This is an important function since it allows the separation of content from presentation—a key function for the extensibility and flexibility of the world wide web. Chris Lilley, a W3C staff contact for the XSL Working Group states that with XSLT "we're closer to delivering rich, structured data content to a wider range of devices." Thus, XSLT allows a variety of devices that support varying markup languages to access content that is in a standardized format—XML.

Although XSLT helps to provide content to a variety of devices, several problems are still present in the state of the art. One such problem is that the majority of web-based content is not formatted as XML documents but rather, as HTML documents. In addition, XML is not the easiest markup language to develop content with, thus, other, more user friendly languages are usually employed. Thus, to truly recognize the benefits of XSLT, there is a need for a mechanism to convert existing content into XML. However, to convert a majority of the content that is available on the web into XML would be a daunting task. In addition, even if such a task could be performed, it would result in crippling the content provider community since the majority of content creators, as well as the tools used to create content, is more HTML oriented rather than XML. Thus, there is a need in the art for a mechanism to convert content to XML, or some other interim format, when the content is being requested by a device. Such a mechanism would need to perform this task in a quick and efficient manner so as not to degrade the performance of accessing web content.

As previously stated, XML is a limited language that only uses a subset of the capabilities of SGML. Because of this, a transformation from one SGML format to XML and then from XML to another SGML format may result in the loss of some information. What is needed in the art is a mechanism to take content from one SGML format and translate it to another SGML format while minimizing the loss of any information. One technique to accomplish this would be to have a device or utility that directly transforms one SGML document into another SGML document. Such a technique would be a tremendous improvement in the world wide web. Another technique to accomplish this would be to have a device or utility that transforms content from a variety of formats, including but not limited to SGML, into an interim format, and coupling this device or utility with another device or utility that would transform content from the interim format to a device specific format.

Internet content may be accessed from an ever increasing number and variety of devices. Today, such devices include desktop computers, laptop computers, hand held personal data assistants (PDA), cellular telephones, appliances, electronic kiosks, GPS devices and many more. In the future it is quite certain that additional devices will be used in the same manner Each such device may have different display capabilities and may utilize varying types of data interpreters. One device may use an SGML based web-browser, one device may use a WAP based browser and yet another device may use a non-markup language based interpreter. The above-described needs in the art are even more apparent when such a variety of devices are all attempting to access content from the world wide web. However, in addition to needing the capability to transform content from one format to another, there is also a need in the art to determine what type of format and what additional format structuring is necessary in order to allow a device to render the content. When the transformations are being performed by a server-based environment rather than a client-based environment, the server must be able to identify the specific requirements of the destination of the content, and interject these specific requirements into the transformation process.

To illustrate the benefits that the present invention gives rise to, a need in the art regarding sever-based applications is provided. To utilize a server-based application, a client device connects to the server and initiates a download of the application. The server acknowledges the request and initializes the application for downloading (note that the application is also usually "compressed" for faster delivery over the Internet). The client device then downloads the compressed application "executable" from the server.

The application is now stored on the client, but is not yet ready for use. The application must first be unpacked or uncompressed, and then typically an installation routine that will make the application ready to run on the client must be invoked. Once this is done, the application can be invoked. Once invoked, the application runs resident in the client's memory. The application must be recalled from the hard drive of the client device, and executed each time it is desired to be used. In addition, the client likely has word processors, spreadsheets, and email editor programs, which must be recalled from its hard disk and made resident in its memory, to be executed. Each application consumes valuable resources of the client device. Thus, there exists a need in the art for a technique to minimize the expenditure of client resources when running server-based applications.

Another problem in the industry can be seen by examining software distribution techniques. Today, revisions or upgrades to application programs must be downloaded or shipped on a digital media ("shrink-wrapped") for installation by end-users. These upgraded versions are expensive to distribute and support costs are also significantly increased. End-users will incur costs of shipping, media and packaging to install the application, and significant problems may occur during these updates (incompatibility with existing software or systems installed on the end-user computer). Thus, there is a need in the art for a method to provide updated software without incurring the current expenses.

Therefore, it has been shown that there is a need in the art for devices that require content in a particular format, to access content through the Internet, or any other local or global network, regardless of the format in which the content is stored. In addition, there is a need in the art for a mechanism to convert content to XML, or some other interim format, when the content is being requested by a device. Such a mechanism would need to perform this task in a quick and efficient manner so as not to degrade the performance of accessing web content. There is also a need in the art to determine what type of format and what additional format structuring in necessary in order to allow a device to render the content.

Finally, there exists a need in the art for a technique to minimize the expenditure of client resources when running server-based applications and for a method to provide updated software without incurring the current expenses. The aforementioned needs in the art, as well as other needs are met by the various embodiments of the present invention that are described within this specification.

BRIEF SUMMARY OF THE INVENTION

The present invention is directed towards solving the aforementioned needs in the art, as well as other needs in the art, by providing a mechanism for transforming content between a variety of formats to allow the content to be rendered on devices that support differing content formats. One aspect of the present invention is that web-based content, which may be found in a variety of formats, can be rendered with a device that only supports a particular content format. Advantageously, this aspect of the present invention extends the usefulness of the world wide web as a general content resource.

Another aspect of the present invention is a content transformer engine that includes a source content input, a memory element, and a conversion unit. The conversion unit receives source content in a first format at the source content input, transforms the source content from the first format into an interim format; and stores the source content in the interim format in the memory element. In one embodiment of this aspect of the present invention, the content transformer engine may transform SGML formatted content. In another embodiment, the interim format may be XML.

Another aspect of the present invention is a content transformer engine that includes a source content input, a destination content output, a destination specific parameter input and a conversion unit. The conversion unit receives source content in a source format at the source content input and at least one parameter from the destination specific parameter input. The conversion unit then transforms the source content from the source format into an interim format. The conversion unit also identifies a destination format for the content, based at least in part on the destination specific parameter. The conversion unit then transforms the source content from the interim format to the destination format and provides the destination formatted content to the destination content output. In one embodiment of this aspect of the present invention, the content transformer operates on SGML content. The interim format may be XML or some other standard or proprietary format.

Another aspect of the present invention is a content transformer engine that includes a client identifier, a template database, a best fit analyzer, a linker database, an inbound content transformer and an outbound content transformer. The client identifier receives a content request from a client device and identifies characteristics about the client device from the content request, and by deriving additional information about the client device from implicit sources and previously stored information. The best fit analyzer selects a best fit template from the template database based, at least in part, on the client device characteristic. The linker database contains location information for content resources and access information for each of the content resources. The inbound content transformer receives source formatted content and transforms the source formatted content into interim formatted content. The outbound content transformer transforms the interim formatted content into destination formatted content in accordance with the best fit template. In one embodiment, the outbound transformer is an extensible style language transformation engine. In another embodiment, the inbound transformer is a reverse extensible style language transformation engine. In various embodiment, the characteristics of the client device may differ. Typical characteristics may include screen resolution, caching capabilities, device type, compression characteristics, decompression characteristics, network characteristics, bandwidth characteristics, and connection type. Thus, these embodiments and aspects of the present invention allow devices that require content in a particular format, to access content through the Internet, or any other local or global network, regardless of the format in which the content exists within the Internet. In addition, the present invention provides a mechanism to convert content to XML, or some other interim format, when the content is being requested by a device performs this task in a quick and efficient manner so as not to degrade the performance of accessing web content.

In another embodiment, the present invention provides the ability for any SGML content to be requested over the Internet and displayed by any SGML-based device making the request. Thus, this aspect of the invention allows the conversion of SGML content within the Internet and/or an intranet to be read and converted into a compatible format for any of a variety of receiving platforms. This exemplary embodiment of the present invention also reads information in an SGML format, converts the information to an interim format, and then renders the information into a different or the same SGML format as originally read.

One utilization of the present invention, is in the delivery and remote access to server-based application programs. This utilization of the invention involves a client or remote computer system invoking an application program residing on a remotely located server system. The client is typically connected to the server system through a network such as the Internet or an intranet. In operation, once a client invokes a server-based application program, the server system provides an application program interface to the client. The application interface can easily be adapted for compatibility with a variety of platform types. The server system obtains platform information from the client, and then constructs and provides a compatible application program interface to the client.

These aspects and embodiments, as well as other aspects and embodiments of the present invention are more clearly described in the specification, figures and claims.

BRIEF DESCRIPTION OF THE SEVERAL VIEWS OF THE DRAWING

FIG. 1a is a block diagram illustrating the functional components of an exemplary embodiment of the transformation engine.

FIG. 1b is a block diagram illustrating the functional components of an exemplary embodiment of the transformation engine that utilizes an interim content format.

DETAILED DESCRIPTION OF THE INVENTION

Figure 2:
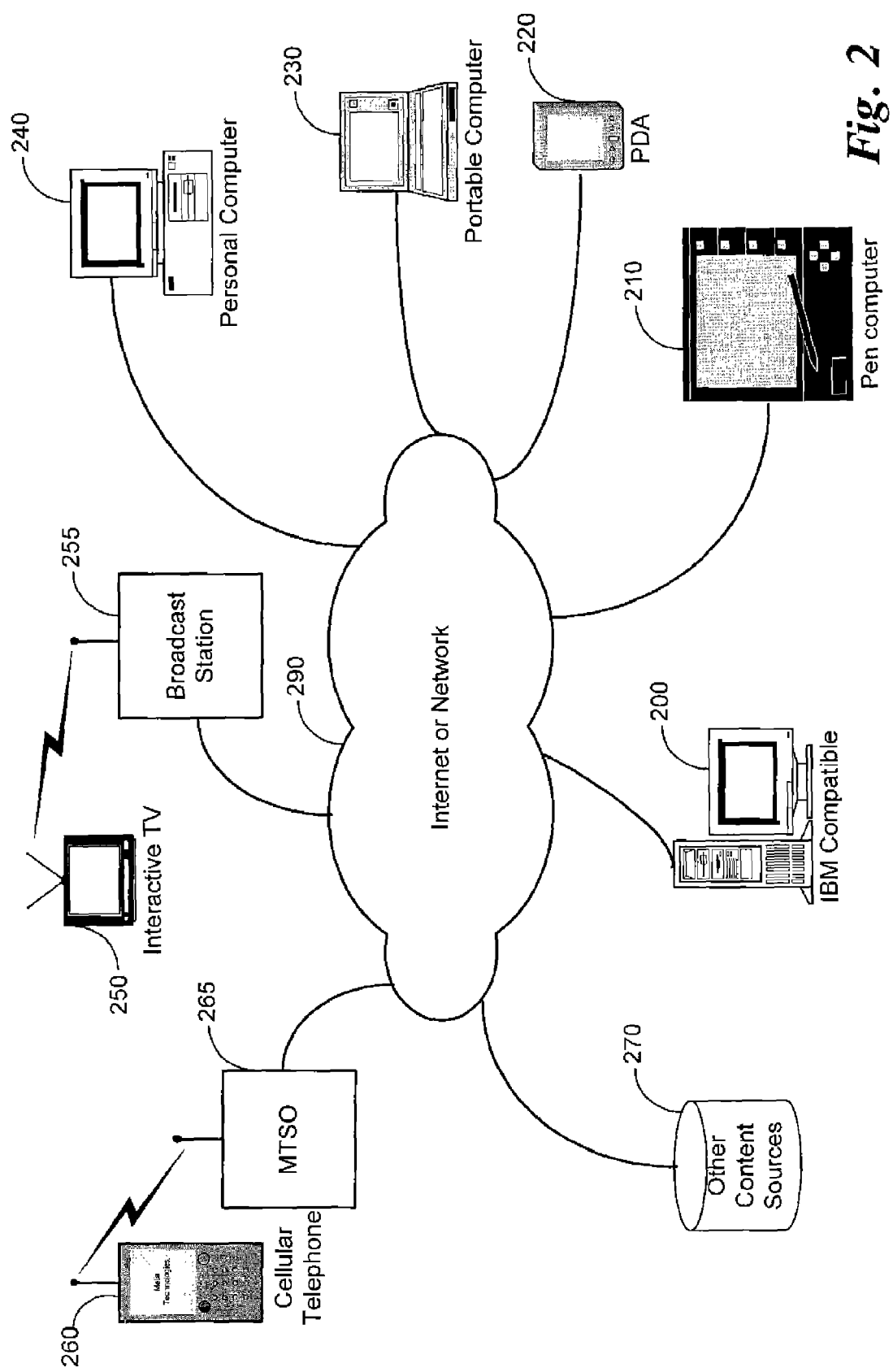
FIG. 2 is a system diagram illustrating an exemplary environment in which the transformation engine can be utilized as a server-based content transformer.

The present invention provides a mechanism for transforming content between a variety of formats through the use of a transformation engine. In a general embodiment of the present invention, the transformation engine reads content in one format and transforms the content into another or the same format. Turning now to the figures in which like numerals, letters and labels refer to like elements throughout the figures, various embodiments and applications of the present invention are provided.

FIG. 1a is a block diagram illustrating the functional components of an exemplary embodiment of the transformation engine. The transformation engine 100a operates to transform source content 110 from its existing format to a destination content format 130 that is compatible with a destination target. The transformation engine 100a includes an s to d content transformer 140, where s and d are variables identifying the format for the source content and the destination content respectively. In operation, the content transformer 140 receives or extracts content stored in a source format (content$_s$) 110 and transforms the content$_s$ into a destination format (content$_d$) 130. This transformation process may include the incorporation of destination specific parameters 135 to control the operation of the transformation. The transformation engine 100a provides a bi-directional transformation of content, meaning that content can be transformed from and into any of a variety of formats. This aspect of the present invention enables universal transformation of content from any type to any type, rapidly and at large scale and volume. This capability is not presently available for sharing of content via the Internet, and intranet or other global or local networks.

Various embodiments of transformer engine 100a may be used to perform specific content translations. In a particular embodiment, the transformer engine 100a may be used to transform content between SGML formats. In this embodiment of the transformer engine 100a, source SGML 110 is input into the content transformer 140. The content transformer 140 then renders the source SGML into a destination SGML format 130. In this embodiment of the transformer engine 100a, the functionality of the content transformer 140 is provided through the use of a modified XSLT engine.

XSLT is an open standard that is sponsored and supported by the W3C organization. Those skilled in the art will be familiar with the operation of XSLT; however, additional information may be obtained from the URL http://www.w3.org/Style/XSL/. The standard XSLT engine takes any XML content and renders it into SGML content or another variant of XML. The XSLT engine is a rules based conversion that examines the content on a tag level and converts the tags and groups of tags into an equivalent or near equivalent set of tags for the desired format. A simple example can be illustrated in the operation of the standard XSLT engine with a break tag. In XML format, a break is portrayed as <br/>. Invoking the XLST engine with HTML identified as the destination format would result in converting <br/> into <br>, the format used by HTML. The standard XSLT engine includes rules for transforming XML to a larger variety of other SGML formats. XSLT is based on template rules which specify how XML documents should be processed. Although conventional programming languages are often sequential, template rules can be based in any order because XSLT is a declarative language. A stylesheet declares what output should be produced when a pattern in the XML document is matched.

The modified XSLT engine of the present invention expands the capabilities of the standard XSLT engine by allowing the ability to identify a destination format, as well as a source format. The standard XSLT engine already includes the rules and stylesheets for multiple SGML formats. This aspect of the present invention expands the use of these rules and stylesheets to all the transformation of one SGML format to another. The determinative factors for the destination SGML format include input parameters and information about the destination for the content, illustrated as destination specific parameters 135 in FIG. 1a.

FIG. 1b is a block diagram illustrating the functional components of an exemplary embodiment of the transformation engine that utilizes an interim content format. The transformation engine 100b operates to transform source content 110 from one its existing format to a format destination content 130 that is compatible for a destination target. The transformation engine 100b includes two main components: (a) an inbound content transformer 115 (source format to interim format) and (b) an outbound content transformer 125 (interim format to destination format). In operation, the inbound content transformer 115 receives or extracts content stored in a source format (content$_s$) 110 and transforms the content into an interim format (content$_i$) 120. Content$_i$ 120 may be stored for future use or it may immediately be processed by the outbound transformer 125 and then discarded. Advantageously, this aspect of this embodiment of the present invention allows content to be staged or temporarily stored in the interim format. If the client device, or even a server device in a server-to-server content exchange, is too slow to receive the content as it is transformed, the interim format is ideal for staging the content until the destination is ready to receive it.

The outbound content transformer 125 transforms the content$_i$ 120 into a destination format (content$_d$) 130. This outbound transformation process may include the incorporation of destination specific parameters 135 to control the operation of the outbound transformation. The transformation engine 100b provides a bi-directional transformation of content, meaning that content can be transformed into a standard or proprietary interim format from a device specific format, and from the standard or proprietary interim format into another or the same device specific format. This aspect of the present invention enables universal transformation of content from any type to any type, rapidly and at large scale and volume. This capability is not presently available for sharing of content via the Internet, and intranet or other global or local networks. Various embodiments of transformer engine 100*b* may be used to perform specific content translations. In a particular embodiment, the transformer engine 100*b* may be used to transform content between SGML formats. In this embodiment of the transformer engine 100*b*, source SGML 110 is the input to the inbound content transformer 115. The inbound content transformer 115 then renders the source SGML into an interim format 120. Preferably the interim format 120 is an industry standard format, such as XML, however any industry standard or proprietary format that allows flexibility can be used. The transformed content in the interim format 120 may be stored in memory or a storage repository for further processing by the outbound content transformer 125. The content is then transformed from the interim format 120 by the outbound transformer 125 into the destination SGML format 130.

In this embodiment of the transformer engine 100*b*, the outbound transformer 125 function could be performed by employing the use of an XSLT engine. The inbound content transformer 115 is basically a reverse operation of the standard XSLT engine. Rather than utilizing the rules of XSLT to transform from XML to SGML, in reverse operation, the XSLT engine transforms SGML to XML. In this manner, the transformer engine 100*b* may convert any source SGML 110 content to any other determinative destination SGML 130 content.

Therefore, in this embodiment, the modifications to the XSLT engine enable the bi-directional transformation of content. Standard XSLT engines, such as Sablotron developed by Ginger Alliance or Unicorn XSLT Processor developed by Unicorn Enterprises, only allow "XML to SGML" transformations. This embodiment of the transformer engine 100 utilizes a modified XSLT engine to enable a reverse transformation "SGML to XML". Thus, this embodiment of the present invention enables universal transformation of content from and to any SGML format, rapidly and at large scale and volume.

It should be clear to those skilled in the art that the use of the XSLT engine and XML is simply one embodiment of the present invention that may be chosen due to convenience, standardization and availability of compatible content and tools. Other transformer engines that convert between other formats may also be employed and the present invention anticipates the development and the use of such other transformer engines.

FIG. 2 is a system diagram illustrating an exemplary environment in which a transformation engine 100 can be utilized as a server-based content transformer. In this environment, the transformer engine 100 is incorporated into an Internet connected server 200. This embodiment of the present invention is referred to as the NIMBUS server engine by the developers of Melia Design Group but, is simply referred to as a server engine 200 herein. Prior to addressing the details of the server engine 200, the general operation and environment for the server engine 200 is provided. The server engine 200 may be used to convert web based or Internet-based content to any of a variety of platforms. For illustrative purposes, FIG. 2 provides a exemplary platforms that may employ the use of the server engine 200 (pen computer 210, PDA 220, portable computer 230, personal computer 240, interactive TV 250 through broadcasting station 255, cellular telephone 260 through mobile telephone switching office 265, and other sources of content 270). The server engine 200, along with the exemplary platforms, is communicatively coupled to the Internet 290, or some other global or local network. Devices wishing to access content may do so through the server engine 200. In operation, the server engine 200 receives a request for content from a device. In response to such a request, the server engine 200 obtains the content for the device as well as information about the device. The server engine 200 then transforms the content from it present format, to a format that is compatible with the requesting device.

As an illustrative example, suppose that a user of cellular telephone 260 desires to obtain a stock quote. Assuming the cellular telephone 260 is equipped with a hand held device markup language browser, the user may browse through a list of bookmarks and select a specific bookmark that will request the stock quote. The server engine 200 supporting the cellular telephone 260 will receive the request. Depending on the particular implementation, the server engine 200 may have pre-stored information about the cellular telephone 260 or, the server engine 200 may enter a process to obtain the information about the cellular telephone 260. In addition, the server engine 200 performs the necessary functions or operations to obtain the stock quote. The stock quote may be in a variety of formats including, HTML or simply ASCII text provided through an online feed. Regardless of the format or source of the content, the server engine 200 extracts the requested content and converts it to a format that is compatible with the cellular telephone 260, which in this case would be HDML. The server engine 200 then provides the requested content to the cellular telephone 260 which then renders the information on its display device 261.

From this illustrative example, it should be evident to the reader that the present invention provides tremendous benefit in the access and sharing of information within a global or local network. Each of the devices illustrated in FIG. 2 may be a content source and a content destination. In addition, each device may require a different format for the content. However, the present invention may be utilized to enable each of the devices to share and receive content from any of the other devices.

Figure 3:
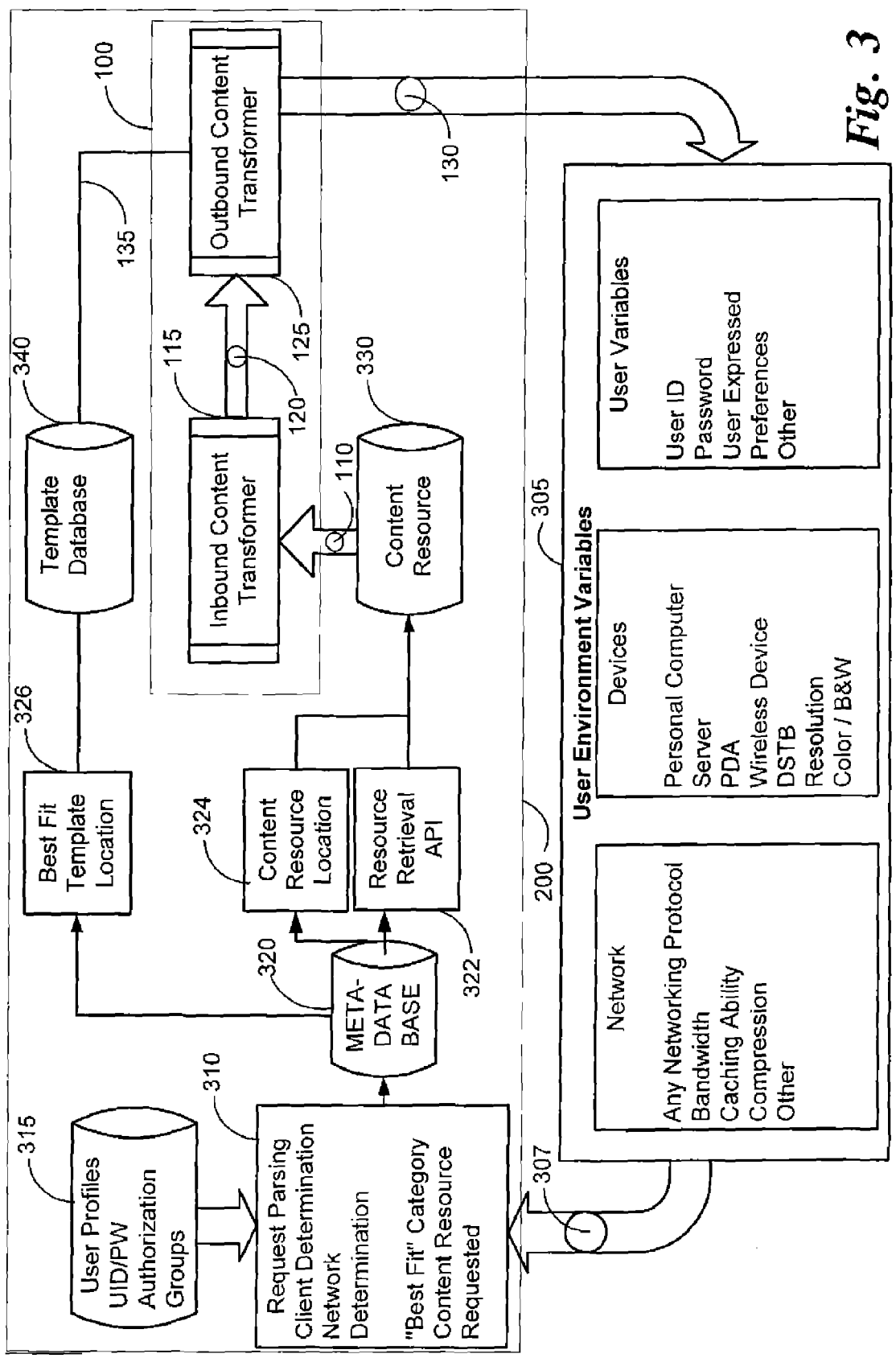
FIG. 3 is a block diagram illustrating further details of the server-based content transformer described in FIG. 2.

FIG. 3 is a block diagram illustrating further details of the operation of the server-based content transformer described in FIG. 2. The overall operation of this embodiment of the present invention can be described in five general processes: (1) Client Identification, Determination and Parsing; (2) Content Storage, Indexing and Retrieval; (3) Content Transformation; (4) Content Packaging; and (5) Content Delivery.

Client Identification, Determination and Parsing. In this embodiment of the present invention, a client device 305 initiates the acquisition of content by issuing a content request 307 to the server engine 200. In response to receiving the content request 307, the server engine 200 attempts to identify the characteristics or device specific information regarding the client device 305 and/or the network from which the client device 305 is operating. Depending on the particular content and structure of the content request 307, the server engine 200 may have sufficient information to proceed, or may require additional information from the client device 305. If additional information is required, the server engine 200 may invoke a series of hand-shaking or communication exchanges with the client device 305. In either case, the server engine 200 must obtain device specific or environmental variables regarding the client device 305. The client device 305 illustrated in FIG. 3 shows three categories of environmental variables. The categories and specific environmental variables provided are intended to be illustrative rather than exhaustive and different devices may include or require different categories or variables. The server engine 200 may determine the client variables from a variety of sources or techniques. A primary source for determining the variables in a web-based request is the HTTP request header since the content request from the client device 305 is normally embedded within a URL string. The server engine 200 may also utilize the "round trip" time and other implied or explicit information to determine the value of the variables.

The variables identify specific content that the client is requesting. Some of the client variables identify the type of device making the request, client screen resolution, the client caching capabilities (on client device and on client network), the device display specifics (resolution, color/B&W/greyscale, type, color bit depth, etc.), and network characteristics (bandwidth, bandwidth/connection type or protocol, variability of bandwidth, compression/decompression rates, etc.). Those skilled in the art will realize this list is not exhaustive and that in any given request each of these variables, fewer than those listed, or more than those listed may be used.

Once the variables and their values have been identified, the server engine 200 performs request parsing 310. One aspect of the request parsing process 310 is to perform a "best fit" analysis by evaluating the variables against an existing "best fit matrix" in order to derive a content category. The best fit matrix is simply a single to multidimensional matrix that receives one or more variables as an input and provides a "best fit" template or profile based on the variables. In some instances, only a single variable may be required. For instance, if the server engine 200 has received a variable that identifies the client device 305 as a specific version and model of a Palm IV PDA, this variable may be used as a single lookup variable to identify the best fit profile. However, in other instances, multiple variables may be required to identify a best fit template. For instance, to identify a best fit template for a hand held wireless device, the server engine 200 may require the following variables: a device type, a display type, a display resolution, and a service grade level.

The content category is utilized by the server engine 200 in an effort to determine a "best fit" method or profile for: (a) sending the correct image, video, text, template, and markup language (HTML, DHTML, SGML, XHTML, XML, etc.) that optimizes display and performance on the client device 305; (b) sending the correct content density for the client's available/effective bandwidth; (c) determining which methodology is appropriate for enabling transactions; and (d) determining what session variables, etc. are available, and which variables are necessary for negotiating and employing appropriate security, encryption algorithms, etc. If the system is unable to determine a "best fit" profile from existing content categories and the client variables, then a best fit value (lowest common denominator fit) is determined and used until enough information related to each of the above variables can be collected.

These client variables are then evaluated against a user's profile 315 (derived from previous interactions with the server engine 200, and supplemented with any new or changed information from the current client identification and determination process). The server engine 200 can be extended to enable the use of shared profiles or parameters (for instance, all AOL users may have similar characteristics, so there is no need to fully evaluate each AOL user independently). The server engine 200 may also be extended for adaptive learning. Using adaptive learning, as user profiles are updated, corrected, or new information is obtained during the user's interaction with the server engine 200, the user's profile is updated to reflect these profiles, corrections and new information.

Thus, during the client identification, determination and parsing process, the server engine 200 extracts information from a content request 307 from a client device 305, utilizes existing information about the client device 305 and/or a user of the client device, and derives information from other sources in an attempt to identify (a) what content to obtain for the client device 305 in response to the content request 307 and (b) how to deliver the content to the client device 305.

Content Storage and Retrieval. The server engine 200 maintains a meta-database 320 (also referred to as a linker database) that contains information about the content resources 330 that are indexed by the server engine 200. A content resource 330 may be any of a variety of devices or entities that provide content or information including, but not limited to, remotely located systems accessible via the Internet or some other means, local systems, live audio or video feeds, live text feeds such as news sources or the like and databases.

Typically, the linker database 320 does not store the actual content, but rather stores information about how (resource retrieval API 322) and where (content resource location 324) to obtain the content. Advantageously, the use of a linker database 320 allows the number and amount of content resources 330 available to the server engine 200 to be virtually limitless.

More specifically, for each content resource 330, the linker database 320 maintains descriptive information to facilitate the server engine's 200 access of content from the content resource 330. Any of a variety of techniques may be utilized to perform this function. In one embodiment, for each particular content resource 330, the linker database 320 maintains (a) a unique system identifier, (b) a resource name, (c) a template required for the display of the available content (a sub-table with various template types), (d) the location and state or status of the available content, (e) the type of content (image, video, streaming video, text, markup language document, application component, etc.), (f) the format of the available content (.jpeg, .mpeg. etc.), (g) the version of the content format for the available content (MPEG2, MPEG3, etc.), (h) the content quality of the available content (color bit depth, resolution, frame size, frames per second, etc.), (i) instruction sets or business rules that describe use information regarding the available content (last use, last used by, date added, date updated, copyrighted or public domain, etc.), (j) a cross-reference to another repository that may contain information necessary to retrieve and utilize the content (i.e., structure query language statement, application program interface, lookup statement, etc.) and (k) other information that may be necessary to optimize the performance of the server engine 200 in the access, conversion and delivery of the content such as, the speed and throughput of the network connection between the server engine 200 and the content resource 330, and the amount of time required to render the content.

Thus, during the content storage and retrieval process, the server engine 200 utilizes the information obtained during the client identification, determination and parsing process, as well as information contained in the linker database 320 to obtain the content requested in the content request 307, as well as additional information regarding the content. Based on the client variables, the server engine 200 may seek out and obtain content that is optimally suited for the client device 305. Advantageously, this aspect of the present invention helps to minimize processing that is required in the transformation of the content. The content, along with any other necessary information is then provided to the inbound content transformer 115.

Transformation, Packaging and Delivery Process. During the transformation, packaging and delivery process, the server engine 200 transforms the content to a format suitable for the client device 305, and then packages and delivers the transformed content to the client device 305.

The content identified in the content request 307 and retrieved from one or more content resources 330 is, based on the "best fit" content category, transformed to a format that is suitable for the client device 305. In the embodiments described in conjunction with FIG. 1, this process may be accomplished by transforming the source content to an interim format 120 and then based on the "best fit" template transforming the content into a destination format 130, or the source content can be directly transformed from the source format 110 to the destination format 130 based on the "best fit" template.

In a specific embodiment of the server engine 200, the outbound content transformer 125 may be an XSLT engine and the inbound content transformer 115 may be a reverse XSLT engine. In this embodiment, the source content will be transformed from a source format ($SGML_s$) 110 to an interim format (XML) 120 and then to a destination format ($SGML_d$) 130. The server engine 200 uses business rules and the "best fit" content category derived during the client identification, determination and parsing process to select the appropriate SGML format for the client device 305. Other engines and engine variants may also be used or developed and the present invention anticipates such development.

Once the content has been transformed, the server engine 200 "wraps" or "overlays" the content with an appropriate template. Once again, based on the "best fit" analysis and the "best fit" content category, the server engine 200 determines a proper set of templates and template parameters for displaying the content and merges the transformed content into the proper template for delivery to the client device 305. The linker database 320, in addition to indexing content resources 330, also indexes a template database 340. The template database 340 may be a local database or a remotely located database accessible to the server engine 200 through the Internet or some other localized or global network. Based on the "best fit" analysis, the location 326 of the "best fit" template can be extracted from the linker database 320 and used to access the "best fit" template from the template database 340.

Thus, the server engine 200 will provide content to the client device 305 in a format that is adapted to the client device 305. The adaptation to the client device 305 is a function of the information indexed from the content resources 330, but is also a function of the template chosen to render the information to the client device 305. This template will be indexed from the template database 340 and its content will be dependent on the values of the client variables and the variables of the content request 307. The template database 340 is a second functional input to the transformation engine 100 and thus, controls the way the output is rendered to the client device 305. The output 130 of the server engine 200 is provided to the client device 305 through a network connection, such as through the Internet. Advantageously, the present invention operates to obtain, transform and deliver the compatible content in a quick and efficient manner.

This aspect of the present invention further enables the dynamic transformation of even currently incompatible content types for a given display device. For instance, content that was formerly too large (in file size, display format) for a Personal Digital Assistant (PDA) can be "thinned down" based on a "best fit" basis to make the content usable to the PDA. Content transformation can occur against content that is stored within the server engine, or against content that is remotely indexed—stored on servers and in repositories (databases, file systems, etc.) that are not proximate to, or related to the server engine. This remote indexing of content very closely follows "peer-to-peer" content indexing (e.g. music sharing systems), but is different in that the content may be of many disparate and heterogeneous types and formats (pictures, video, music files, stock ticker data, text documents, HTML, etc.); thus more akin to a server-to-server functionality.

It should also be noted that in alternative embodiments, the server engine 200 may offer integrated security. Integrated security includes application components, template design, database access, and application access, all determined by the same security (users & groups) level of access. This keeps all access to the server engine 200 under a single governing system. The server engine 200 circumvents standard browser based security messages by intercepting these messages, processing them (as normal content) into the server engine 200, "wrapping" the security dialog in an appropriate template, and rendering them in a consistent format as a "containerized application" through which the user can interact within the System.

Applications of the Present Invention

The present invention, as described above, is revolutionary in its ability to access content in any format and deliver the content in a compatible format to another device. In addition, there are many revolutionary applications of the present invention that, prior to such invention, were not available or possible to implement. Two such applications include (1) a content manager and (2) platform agnostic server-based applications.

Content Manager. Within the context of a content manager, the present invention empowers users at all skill levels, whether they have little to no HTML or other markup language knowledge or experience, to create and manage content. The transformer engine aspect of the present invention allows the content of a web site to be stored in an interim format and then accessed and transformed for any of a variety of platforms. In addition, as will become more apparent upon reading the description of the platform-agnostic server-based applications, the web site content can be easily edited and managed, from any platform, using a user friendly, intuitive interface.

The present invention can be utilized to create different toolsets. The toolsets are functional aspects that enable the actuation of content (e.g. print function, cut function, paste function, bold, italics, underline, size, symbols, justify, bullets, number, indent, color, linking, etc.). Though initial applications have been developed using the toolset of the present invention, those skilled in the art will realize that other applications and other toolsets that leverage the present invention can be used/reused to create more applications and toolsets. Thus, numerous embodiments of this invention include different toolsets and application combinations.

The content manager based on the present invention provides a "create once, publish anywhere" (COPA) capability. Thus, content can be created and then rendered in any format to any device. The ability to populate a system once for multiple devices is very advantageous. The content managers can handle a number of different markup language, including but not limited to, wireless, handheld devices and set-top boxes, in addition to the variety of formats on the Web. The content manager allows a user to preview the content on multiple devices before the content is published. The content manager also allows a user to create different sets of device templates.

Figure 4:
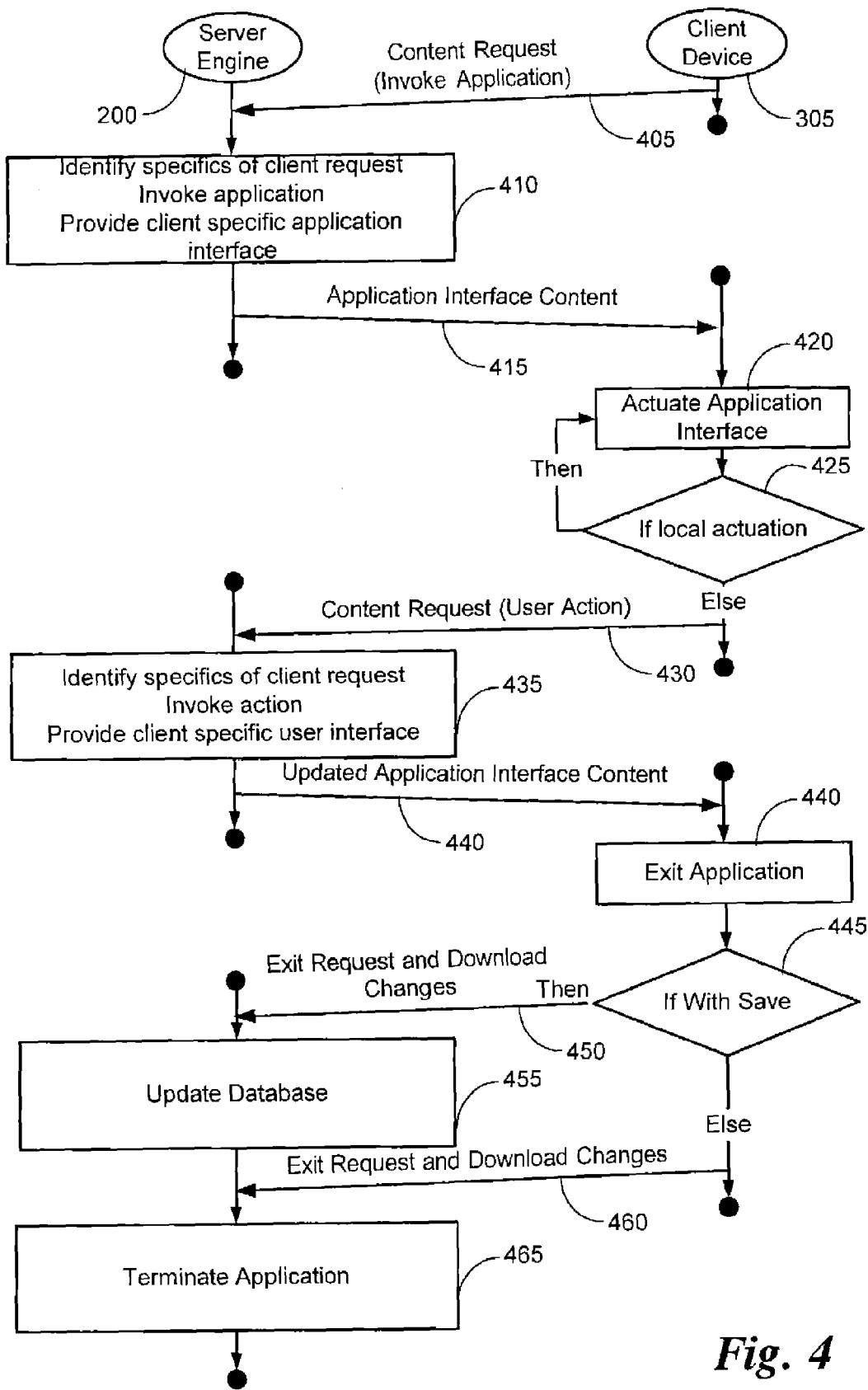
FIG. 4 is a process flow diagram illustrating a particular application of the present invention in providing a device-agnostic interface capability for server-based applications.

Platform-Agnostic Server-Based Applications. FIG. 4 is a process flow diagram illustrating a particular application of the present invention in providing a platform-agnostic interface capability for server-based applications. In general, the present invention provides for the capability for server-based applications to be shared with a variety of platforms. User interface information is stored in an interim format on the server and then rendered to device specific formats when the applications are invoked or actuated by a client device. Thus, the server-based applications can be shared with any of a variety of platforms.

Initially, the client device 305 invokes a server-based application by issuing a content request 405. The server-based application may reside on the server engine 200 or any remote server accessible by the server engine 200. In response to receiving the content request 405, the server engine 200 identifies the specifics of content request, invokes the application and produces a client specific application interface 410. The server engine 200 then delivers content defining the application interface 415 to the client device 305.

This application interface provided to the client device 305 may be a custom application interface that runs resident on the client device 305, a browser-based interface that runs resident within a browser application running on the client device 305, or a browser-like application interface which runs resident on the client device 305. For a personal computer user, a browser-based application may have the look and function of an "executable" compiled 32-bit processing calculator application interface running on the clients computer. However, in reality, only a shell interface is provided to the client and a portion of the processing is performed on the server. This invention is not limited, however, solely to 32-bit interfaces, but can be automatically adapted to provide an interface that is similar to the operating system and programming style of the end user's client.

Upon receiving the content defining the application interface 415, the client device 305 renders the application interface on its display and then waits for a user or process to actuate a feature of the application interface. The performance of, and actuation of, the server-based application will be exactly like, or similar to, the actuation required for a compiled, executable application. Once the application interface is actuated 420, the actuation will either be handled locally by the client device 305 or remote to the client device 305. For local processing 425, the client device 305 simply interprets the actuation and performs the appropriate action. As an example, if the server-based application is a calculator, actuating a digit key may be processed locally and thus, the client device 305 would render a number on the display. If the actuation is to be processed remotely 425, the client device 305 provides a content request 430 to the server engine 200.

In response to receiving the content request 430, the server engine 200 identifies specifics of the content request, invokes the appropriate action, and produces a modified application interface if necessary 435. Once the modified application interface is produced, the server engine 200 provides the content 440 to the client device 305. Additional actuation may be performed by the client device 305 and each will be processed as described above.

Eventually, the client device 305 may attempt to exit the application 440. If an exit with a request to save any modifications is performed 445, the client device 305 provides an exit request and any data that needs to be saved 450 to the server engine 200. In response to receiving the exit request with a save 450, the server engine 200 updates any necessary databases with the changes 455. If an exit without a request to save any modifications is performed 445, the client device 305 provides and exit request 460 to the server engine 200. Whether the exit request is with or without a save operation, the server engine 200 then closes or terminates the application 465.

The server engine's distinct ability to remotely index any content, also applies to these applications of the present invention. For the content manager, components (source code modules to support menu drop downs, buttons, dialog boxes, pop-up windows, subroutines, etc.) can be remotely index, and dynamically served.

The content manager application is actually a specific embodiment of the device-agnostic server-based application implementation of the present invention. The content manager enables a client device to access and change Internet delivered (website) content from an application that is provided to the client device from a remote server, using code components and controls that are only delivered via an Internet browser or browser-based application interface or some other application interface.

This application of the present invention illustrates the impact of the present invention in Internet and intranet publishing and content management fields, as well as the field of software and hardware development related to the delivery to remote telecommunications devices such as pagers, Personal Digital Assistants ("PDAs"), interactive TV, digital set-top boxes, and the like. Application of this invention enables persons engaged in the creation or maintenance and delivery of content (websites, programs, interactive television, data, etc.) to use remote-server-based software components to alter the content without requiring:

(a) The downloading, installation and execution of compiled code components on the user's "client";

(b) A "browser add-on application or applet" to be created or executed from the local (client) machine or server; and/or (c) HTML, DHTML, XML, Active Server Pages, or other Internet Markup language expertise or experience.

Advantageously, this application of the present invention reduces the requirement for the physical distribution of software, requiring the user to purchase media and documentation that includes the cost of that distribution. There is no need to download and install the application, and immediate upgrades are made available as a result of the invention's functionality.

Another feature of the system is the ability to maintain the state of the application in memory or storage of the server, enabling the end user to suspend interaction with the application for a period of time from their client, and later, to pick up "where they left off" using the same client, or a different client. For instance, the end user may perform some calculations using his or her PDA, to stop those calculations for a period of time, and later, to begin again at the same point in the calculative process from the personal computer in the end user's office. Regardless of device or interface, the functionality will be similar, and the information and processing provided by the calculator will be the same, regardless of the end-user's display device.

CONCLUSION

It should be apparent to the reader that the present invention is unique in the industry and provides a revolutionary ability for sharing applications via the Internet. The present invention has been shown to include a transformation engine that enables content and information to be transformed from one format, a source format, to a format that is compatible with the requesting device, a destination format. This aspect of the present invention allows for varying devices to access and share content via a network without concern as to the format of the content. In addition, the present invention enables applications that were not available prior to this invention. The examples herein have been provided for illustrative purposes only and should in not be interpreted as restricting any aspects of the present invention. Alternate embodiments will become apparent to those skilled in the art to which the present invention pertains without departing from its spirit and scope. Accordingly, the scope of the present invention is described by the appended claims and supported by the foregoing description.

What is claimed is:

1. A method implemented by a server, the method comprising:
   receiving, by the server, a request for an application from a client device, the request identifying one or more client variables that describe the client device;
   in response to receiving the request:
      determining, by the server, a destination environment of the client device, the determining based on at least one of the client variables;
      obtaining, based on the determined destination environment, a version of an application component of the application, the version of the application component configured for the destination environment;
      invoking, by the server, the obtained version of the application component;
      creating, by the server, based on the determined destination environment and using interim data resulting from the server invoking the obtained version of the application component, an application interface for the application component; and
      packaging, by the server, the application interface for communication to the client device.

2. The method of claim 1 wherein the one or more client variables describe hardware characteristics of the client device.

3. The method of claim 1 wherein the one or more client variables describe a network connection that communicatively couples the server to the client device.

4. The method of claim 1 wherein the one or more client variables describe compression or decompression characteristics of the client device.

5. The method of claim 1 wherein creating the application interface using the interim data comprises encapsulating the interim data in the application interface so that a visual characteristic resulting from invoking the obtained version of the application component is displayable at the client device without invoking the obtained version of the application component again.

6. The method of claim 1 wherein the application interface is configured to be executed within a browser at the client device.

7. The method of claim 1 wherein:
   the version of the application component is obtained from one of a plurality of locations accessible via a network; and
   the obtaining includes querying a database that contains information about the plurality of locations.

8. The method of claim 7 wherein the request further includes data that describes a user of the client device and the querying is performed using the data that describes the user of the client device.

9. A server comprising a processor and memory, the memory storing instructions that, responsive to execution by the processor, cause the server to perform operations including:
   receiving, by the server, a request from a client device, the request identifying one or more client variables that describe the client device and an application that is requested by the client device; and
   in response to receiving the request:
      determining a destination environment of the client device based on at least one of the client variables;
      obtaining, based on the determined destination environment, a version of an application component of the application, the version of the application component configured for the destination environment;
      invoking the obtained version of the application component; and
      creating, based on the determined destination environment and using interim data resulting from the server invoking the obtained version of the application component, an application interface for the application component.

10. The server of claim 9 wherein the obtaining includes querying a database that includes access information for each of a plurality of versions of the application component.

11. The server of claim 9 wherein the version of an application component is obtained via a network interface.

12. The server of claim 9 wherein the application interface is configured to be executed within a browser at the client device.

13. The server of claim 9 wherein the one or more client variables describe hardware characteristics of the client device.

14. The server of claim 9 wherein the one or more client variables describe a network connection that communicatively couples the server to the client device.

15. The server of claim 9 wherein the one or more client variables describe compression or decompression characteristics of the client device.

16. The server of claim 9 wherein creating the application interface using the interim data comprises encapsulating the interim data in the application interface so that a visual characteristic resulting from invoking the obtained version of the application component is displayable at the client device without invoking the obtained version of the application component again.

17. The server of claim 10 wherein the request further includes data that describes a user of the client device and the querying is performed using the data that describes the user of the client device.

18. The server of claim 17 wherein the data is a shared profile of users common to a particular domain.

19. A computer-readable storage medium, that is not soley a transitory propagating signal, storing instructions that, when executed by a computing device, cause the computing device to perform operations for interfacing with an application executed by a server, the operations comprising:
   transmitting to the server a request from a client device, the request identifying one or more client variables that describe the client device and an application that is requested by the client device, wherein the request causes the server to:
      determine a destination environment of the client device based on at least one of the client variables,
      obtain, based on the determined destination environment, a version of an application component of the application, the version of the application component configured for the destination environment,
      invoke the obtained version of the application component, and
      create, based on the determined destination environment and using interim data resulting from the server invoking the obtained version of the application component, an application interface for the application component; and receiving, from the server, the application interface for the application.

20. The computer-readable storage medium of claim 19 wherein:
   the one or more client variables describe one or more of:
      hardware characteristics of the client device;
      a network connection that communicatively couples the server to the client device;
      compression or decompression characteristics of the client device; or
      data that describes a user of the client device; and
   the operations further include executing the application interface within a browser at the client device.

* * * * *